United States Patent Office 3,677,841

Patented July 18, 1972

3,677,841
GAS GENERATOR COMPOSITION CONTAINING A NITROGEN-RICH COMPOUND AND A CATALYST

William M. Ayres, Ridgecrest, and Ronald A. Henry, China Lake, Calif., assignors to the United States of America as represented by the Secretary of the Navy No Drawing. Filed Apr. 17, 1969, Ser. No. 817,623
Int. Cl. C06b *15/02*
U.S. Cl. 149—92 10 Claims

ABSTRACT OF THE DISCLOSURE

Gas generator formulations which decompose exothermically at low pressures and low flame temperature suitable for disseminating solid agents with high efficiency. A representative formulation comprises the nitrogen-rich fuel, triaminoguanidinium 5-nitroaminotetrazole intimately mixed with the catalyst, vanadyl acetylacetonate.

GOVERNMENT INTEREST

The invention described herein may be manufactured and used by or for the Government of the United States of America for governmental purposes without the payment of any royalities thereon or therefor.

BACKGROUND OF THE INVENTION

The conventional gas generator formulations used for the generation of colored smokes or the dissemination of agents consists mainly of potassium chlorate, sulfur and sodium bicarbonate. Binders or modifiers may also be present. There are several distinct deficiencies in such formulations. Water is a product of the combustion and hydrolysis of the agent often occurs as does pyrolysis of the agent, because the flame temperature is normally fairly high. More importantly, since the agent to be dispersed is usually admixed with the pyrotechnic formulation and since it is usually an organic compound, the oxidation process which supports the sustained decomposition does not discriminate between fuel (sulfur) and added agent. These factors working either separately or together can lead to low dissemination efficiencies. With some labile agents this technique of dissemination cannot be employed at all and with expensive agents the process is wasteful. The present formulation decomposes exothermically at low pressures and generates nonoxidizing gaseous products which are highly compatible with the agents to be dispersed and which are formed at low flame temperatures.

It is the general purpose to provide gas generator formulations capable of the dissemination of solid agents with high efficiency. Another object is to provide a formulation which can be used in disseminating labile agents or dyes with less loss than with more conventional gas generating formulations. Yet another object is to provide gas generator formulations which can be used either for thermal dissemination or explosive dissemination when suitably initiated and boosted.

DESCRIPTION OF THE INVENTION

In accordance with the present invention a representative nitrogen-rich compound, triaminoguanidinium 5-nitroaminotetrazole, having the formula, was intimately mixed with vanadyl acetylacetonate and pressed into pellets. When ignited this formulation underwent a consistently sustained decomposition at 15 p.s.i.a. at a rate of 0.56 in./sec. and at 50 p.s.i.a of 1.77 in./sec.

The formulation containing triaminoguanidinium 5-nitroaminotetrazole was diluted with an equal weight of N-methylaminoanthraquinone, a dye used to make red colored smoke, and pressed into pellets. When some of the pellets were ignited a sustained decomposition at 15 p.s.i.a. (0.08 in./sec.) took place forming a brilliant red smoke. Measurements in the laboratory with small charges of this formulation indicate a dissemination efficiency of about 79% at 15 p.s.i.a. and of about 93% at 100 p.s.i.a.

Concentration of the catalyst, vanadyl acetylacetonate, $VO[OC(CH_3):CHCOCH_3]_2$ can be varied widely as the following decomposition rates at 15 p.s.i.a. with the same triaminoguanidinium 5-nitroaminotetrazole demonstrate:

| Sample: | Decomposition rate in./sec. |
|---|---|
| (I)—triaminoguanidium 5-nitroaminotetrazole (no catalyst) | 0.095 |
| (II)—triaminoguanidinium 5-nitroaminotetrazole+3.9% catalyst | 0.29 |
| (III)—triaminoguanidinium 5-nitroaminotetrazole+7.8% catalyst | 0.47 |
| (IV)—triaminoguanidinium 5-nitroaminotetrazole+15.6% catalyst | 0.38 |

The maximum rate of enhancement is realized with about 6–9% by weight of the catalyst, vanadyl acetylacetonate.

Sample IV has a density of 1.428 g./cc. impact sensitivity of 11 cm. (50% point, 2 kg. hammer) and decomposition rates at 15, 50, and 100 p.s.i.a of 0.38, 2.12, and 4.35 in./sec., respectively.

Guanidinium 5-nitroaminotetrazole, pressed to pellets of density of 1.460 g./cc., will not undergo sustained decomposition at 15 p.s.i.a. when ignited. When mixed with 7% of vanadyl acetylacetonate by weight and pressed into pellets (density, 1.436 g./cc.), this catalyzed guanidinium 5-nitroaminotetrazole mixture does undergo sustained decomposition at 15 p.s.i.a. at a rate of about 0.11 in./sec. A comparison of decomposition rates in inches per second at other pressures follows, the first number being for the uncatalyzed system, the second for the composition with 7% vanadyl acetylacetonate: (30 p.s.i.a.) 0.10, 0.18; (50 p.s.i.a.) 0.15, 0.27; (100 p.s.i.a.) 0.3, 0.45; (200 p.s.i.a.) 0.53, 0.70.

The decomposition rates of a vanadyl acetylacetonate and triaminoguanidinium 5-nitroaminotetrazole (7:93) fuel mixture loaded with N-methylaminoanthraquinone can be controlled by the amount of load as the following results at atmospheric pressure show: 100% fuel, 0.34 in./sec.; 50% fuel, 50% load, 0.07 in./sec.; 45% fuel, 55% load, 0.04 in./sec.; 40% fuel, 60% load, 0.01 in./sec.; 35% fuel, 65% load, will not sustain decomposition. By way of comparison a blend consisting of 65% triaminoguanidinium 5-nitroaminotetrazole, 35% load with no vanadyl acetylacetonate would not ignite or sustain decomposition below 750 p.s.i.a. All ratios are on a weight basis.

Triaminoguanidinium 5-nitroaminotetrazole and three new catalysts were investigated for decomposition rates. The results are shown in the following examples:

EXAMPLE I

93% by weight triaminoguanidinium 5-nitroaminotetrazole and 7% by weight titanyl acetylacetonate, $$TiO[OC(CH_3):CHCOCH_3]_2$$

were blended together and pressed to a density of 1.45 g./cc. The decomposition rates were 0.185, 0.420, and 0.600 in./sec. at 15, 50, and 100 p.s.i.a., respectively.

EXAMPLE II

93% by weight triaminoguanidinium 5-nitroaminotetrazole and 7% by weight cupric acetylacetonate, $$Cu[OC(CH_3):CHCOCH_3]_2$$

were blended together. The pressed density of this fuel was 1.40 g./cc. with decomposition rates of 0.155, 0.365, and 0.710 in./sec. at pressures of 15, 50, and 100 p.s.i.a., respectively.

EXAMPLE III

93% by weight triaminoguanidinium 5-nitroaminotetrazole and 7% by weight vanadyl 2-methyl-5-tetrazole-carboxylate trihydrate, were mixed together. The impact sensitivity of this material was 15.5 cm., the pressed density 1.62 g./cc. (pressed at 67,000 p.s.i.). The decomposition rates at 15, 50, and 100 p.s.i.a. were: 0.475, 1.03, and 1.67 in./sec., respectively.

The catalytic effect of vanadium and vanadyl acetylacetonate on other polynitrogen compounds such as nitroaminoguanidine, $[NH_2NHC(NH_2)NNO_2]$, was tested and found most promising. The catalysts were successful in lowering the minimum pressure required for sustained decomposition of nitroaminoguanidine. Vanadyl acetylacetonate was the most effective of the fuel additives.

Catalyzed nitroaminoguanidine and triaminoguanidinium 5-nitroaminotetrazole fuels decomposed rapidly and with little residue at all pressures under consideration. The catalyzed triaminoguanidinium 5-nitroaminotetrazole system has yielded significantly increased decomposition rates when compared to all the compounds and dyes studied. Though the decomposition rates of the dye-loaded material are still lower than optimum at low pressures, they are generally about 200% faster than those observed with the catalyzed nitroaminoguanidine system. In addition the oxygen content of the triaminoguanidinium 5-nitroaminotetrazole fuels is about half of that of the nitroaminoguanidine fuels and all (including 50:50 mixes) ignite and sustain decomposition at atmospheric pressure.

By catalyzing nitroaminoguanidine with 5% by weight of vanadylacetylacetonate, sustained decomposition in pressed pellets can be realized at 15 p.s.i.a. at a rate of about 0.17–0.21 in./sec.; with an equal weight of load, the rate at atmospheric pressure drops to 0.025 in./sec. Nitroaminoguanidine without a catalyst in a 50:50 dye mix will not ignite or decompose at 15 p.s.i.a. The measured dissemination efficiency for N-methylaminoanthraquinone at 100 p.s.i.a. was 75%, 18–20% less than that realized with a comparable triaminoguanidinium 5-nitroaminotetrazole formulation under similar conditions. This drop in efficiency is probably related both to the higher flame temperature and to the higher oxygen content of the nitroaminoguanidine formulation than those found with the triaminoguanidinium 5-nitroaminotetrazole composition.

When pyrotechnic compositions with low decomposition rates (0.01–0.02 in./sec. at 15 p.s.i.a.) are desired, catalyzed nitroaminoguanidine fuels could be used instead of the triaminoguanidinium 5-nitroaminotetrazole systems.

Several nitrogen-rich compounds were prepared with a catalyst as follows:

(A)

95% nitroaminoguanidine
5% nickel acetylacetonate (B)

95% nitroaminoguanidine
5% aluminum acetylacetonate (C)

95% nitroaminoguanidine
5% vanadium acetylacetonate (D)

95% nitroaminoguanidine
5% zirconium acetylacetonate (E)

95% nitroaminoguanidine
5% vanadyl acetylacetonate (F)

95.7% nitroaminoguanidine
2.3% ammonium metavanadate (G)

98.22% nitroaminoguanidine
.78% vanadium pentoxide (H)

94.79% triaminoguanidinium 5-nitroaminotetrazole
5.21% vanadyl acetylacetonate (I)

94.79% triaminoguanidinium azide
5.20% vanadyl acetylacetonate (J)

84.38 to 93.4% triaminoguanidinium 5-nitroaminotetrazole
2.6 to 15.62% vanadyl acetylacetonate Guanidinium 5-nitroaminotetrazole, 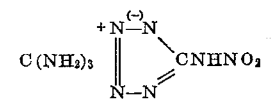 catalyzed with vanadyl acetylacetonate (79.16:20.84) will undergo sustained decomposition at 15 p.s.i.a. with a rate of about 0.48 in./sec.

The decomposition rate of ammonium azide $(NH_4N_3)$ catalyzed with vanadyl acetylacetonate (94.79:5.21) was higher than that of the azide alone by a factor of ten.

Other vanadyl compounds which will effect dramatic increases in the decomposition rate of triaminoguanidinium 5-nitroaminotetrazole and other nitrogen-rich compounds when blended at about the 7% by weight level are vanadyl 2-methyl-5-tetrazole-carboxylate trihydrate (0.48 in./sec. at 15 p.s.i.a.); vanadyl tartrate (0.33 in./sec. at 15 p.s.i.a.); and vanadyl N-(2-hydroxyphenyl)salicyldieneimine (0.40 in./sec.).

A loaded formulation of equal weights of pyrotechnic fuel and N-methylaminoanthraquinone based on triaminoguanidinium 5-nitroaminotetrazole and vanadyl N-(2-hydroxyphenyl)salicylideneimine, 93:7 will undergo sustained decomposition at 15 p.s.i.a. with a rate of about 0.054 in./sec., somewhat less than that normally realized with the comparable vanadyl acetylacetonate blend. Molybdenyl acetylacetonate is also a moderately effective catalyst. Thus, pressed pellets of a blend, consisting of 93% triaminoguanidinium 5-nitroaminotetrazole and 7% molybdenyl acetylacetonate had a decomposition rate of 0.38 in./sec. at 15 p.s.i.a., 0.81 in./sec. at 50 p.s.i.a., and 139 in./sec. at 50 p.s.i.a.

These novel gas generating formulations will undergo reproducibly, controllable, and sustained decomposition at atmospheric pressure or slightly above even when admixed with an equal weight of a load which is to be dispersed by the action of the decomposing formulation. The discovery that certain vanadyl salts or complexes are effective catalysts for accelerating the decomposition of the nitrogen-rich compounds provides a means for dispersion of anti-personnel agents in a single and inexpensive manner. By varying the amount of catalyst, the ratio of load to fuel, and type of nitrogen-rich compound used, control of the decomposition (or dissemination) rate is achieved.

The nitrogen-rich compound, triaminoguanidinium 5-nitroaminotetrazole used herein can be made by a metathetical reaction between purified triaminoguanidinium chloride and potassium 5-nitroaminotetrazole in water, at a concentration such that a substantial amount of the less soluble triaminoguanidinium 5-nitroaminotetrazole will have crystallized when the solution is cooled to 0° C. without potassium chloride crystallizing. It can also be prepared by dissolving 130 g. of unrecrystallized but dried ammonium 5-nitroaminotetrazole and 122 g. of triaminoguanidinium chloride in 950 ml. of hot water. Cooling to 5° C. gives a solid cake of small, white, felted needles, which is filtered and pressed to remove as much of the aqueous phase as possible. The wet cake of crude product is dissolved in 900–950 ml. of hot distilled water and the solution is filtered rapidly and then cooled to 5° C. The felted cake is again filtered and pressed to remove aqueous phase. This once recrystallized product was broken up and stored as the wet cake which still contained 25–35% water depending on the efficiency of the filtration. The dried product decomposes vigorously about 190° C.; the impact sensitivity (50% point, 2-kg. hammer) is 15 cm.

The starting material used in preparing triaminoguanidinium 5-nitroaminotetrazole comprising ammonium 5-nitroaminotetrazole can be prepared by the following process: anhydrous 5-aminotetrazole (127.5 grams, 1.5 moles) is added in small portions during 20 minutes and with good agitation to 300 ml. of 96% sulfuric acid; external cooling is used to keep the temperature below 40° C. After the solution has cooled to about 20° C., 120 ml. of 90% nitric acid is added drop-wise with stirring during 20–25 minutes. The temperature of the reaction is held 20–25° C. by an ice-water bath. The latter is then removed and the solution stirred for 15 minutes more. The nitration mixture is poured over 3,000 grams of crushed ice with stirring, and immediately neutralized to the bromphenolblue endpoint with 28% aqueous ammonium hydroxide which has been cooled to 0° C. Approximately 100 g. more of ice is added during neutralization and the temperature at the end reached 17–20° C. Much solid crystallized from the solution and was removed by filtration after the solution had been recooled to 5° C. The salt is washed once with just enough ice-water to wet the cake completely, then dried. The yield was 187.9 g. (85% of theory). When 108.9 grams of the salt was recrystallized from 300 ml. of water, 91.3 grams (84%) was recovered (cooled to 5° C.). The impact sensitivity of the dried, recrystallized ammonium 5-nitroaminotetrazole was 17.5 cm. (50% point, 2-kg. hammer).

Lead acetylacetonate, guanidinium dichromate, and guanidinium chromate are fair catalysts for the nitrogen-rich compounds producing effective decomposition rates. The dichromate salt promoted faster decomposition of triaminoguanidinium 5-nitroaminotetrazole than did the chromate catalyst.

As herein disclosed both vanadyl tartrate and vanadyl N-(2-hydroxyphenyl)salicylideneimine showed promising catalytic activity when mixed with triaminoguanidinium 5-nitroaminotetrazole and at the same time furnished fuel compositions with significantly better storage stability. Triaminoguanidinium 5-nitroaminotetrazole, 85% by weight, and vanadyl N-(2-hydroxyphenyl)salicylideneimine, 15% by weight has a density and impact sensitivity similar to that wherein vanadyl acetylacetonate was used. It will undergo sustained decomposition at atmospheric pressure when loaded with an equal weight of agent simulant (dye) and will disseminate the dye with a measured efficiency of 80–90%.

Dye loading studies using N-methylaminoanthraquinone as an agent simulant have shown that the decomposition rate for most of these new gas generating formulations are reached at a 6–7% catalyst level and that a 60% dye load is the maximum at which the catalyzed fuel can be successfully ignited and decomposed at atmospheric pressure. Saccharin powder has also been used as a simulant for certain incapacitating agents or anti-personnel agents in an effort to improve the dissemination effectiveness of such types of particulate matter.

Vanadyl 2-methyl-5-tetrazolecarboxylate trihydrate, may be prepared as follows: 2-methyl-5-tetrazolecarboxylic acid (1.1 g., 0.086 mole) and 0.72 g. of sodium bicarbonate were dissolved in 8 ml. of water, and added to 0.81 g. of vanadyl sulfate in 5 ml. of water at room temperature. Upon cooling a pale blue solid slowly separated. The salt was filtered, washed with a small volume of cold water, and dried in a vacuum desiccator over calcium chloride at room temperature.

*Analysis.*—Calculated for $C_6H_6N_8O_5V$ (percent): C, 19.21; H, 3.23; N, 29.87. Found (percent): C, 19.35; H, 2.90; N, 29.72.

Vanadyl tartrate was prepared by heating to boiling 15.0 g. (0.1 mole) of tartaric acid and 31.6 g. of barium hydroxide octahydrate in 750 ml. of water, then adding 16.3 g. (0.1 mole) of vanadyl sulfate. The mixture was digested on the steam bath for 8 hours. The resulting slurry was filtered and the cake washed with hot water (22.2 g. of barium sulfate was recovered; theory 23.3 g.). The combined filtrates were evaporated to dryness under reduced pressure to leave a dark blue, glassy residue. The latter was titrated with 200 ml. of absolute ethanol; the solid which formed was filtered and washed twice with cold ethanol. The yield of dried blue product was 21.2 g. A portion (10 g.) was purified by solution in 30 ml. of water, filtering and adding 50 ml. of 95% ethanol. The flocculent blue precipitate which separated immediately was filtered, washed once with 60% aqueous ethanol, and once with 95% ethanol. The material was first vacuum dried at room temperature, then at 70–80° C., 25 mm., for 5 days. The recovery was 5 g. An additional 0.8 g. was isolated by adding 150 ml. of absolute ethanol to the recrystallization mother liquors. Both fractions had the same carbon-hydrogen content.

*Analysis.*—Found (percent): C, 19.46, 19.29; H, 2.39, 2.39.

Vanadyl N - (2 - hydroxyphenyl)salicylideneimine, $C_{13}H_9NO_3V$, can be prepared by the method described by A. P. Ginsberg, E. Kaulek, and H. J. Williams in Inorganic Chemistry, 5, 1656–57 (1966).

What is claimed is:

1. A gas generator formulation comprising:

a blend of a nitrogen-rich compound selected from the group consisting of triaminoguanidinium 5-nitroaminotetrazole, nitroaminoguanidine, guanidinium 5-nitroaminotetrazole, ammonium azide, and triaminoguanidinium azide, and a catalyst selected from the group consisting of vanadyl acetylacetonate, vanadyl N-(2-hydroxyphenyl)salicylideneimine, vanadyl 2-methyl-5-tetrazolecarboxylideneimine, vanadyl 2-methyl-5-tetrazolecarboxnadate, vanadium pentoxide, zirconium acetylacetonate, aluminum acetylacetonate, nickel acetylacetonate titanyl acetylacetonate, cupric acetylacetonate, lead acetylacetonate, guanidinium chromate and guanidinium dichromate.

2. The formulation in accordance with claim 1 wherein the catalyst concentration ranges from about 1–16% by weight.

3. The formulation in accordance with claim 1 with an additional component selected from the group consisting of a solid anti-personnel agent, a dye, and dye mixture, in about equal amounts by weight of formulation and component.

4. The formulation in accordance with claim 1 and an additional component consisting essentially of N-methylaminoanthraquinone in about equal amounts by weight of formulation and N-methylaminoanthraquinone.

5. The formulation in accordance with claim 1 wherein the nitrogen-rich compound is triaminoguanidinum 5-nitroaminotetrazole and the catalyst is vanadyl acetylacetonate.

6. The formulation in accordance with claim 5 wherein the percentage by weight of said nitrogen-rich compound ranges from 84% to 94% and the percentage by weight of catalyst ranges from 2% to 16%.

7. The formulation in accordance with claim 6 with an additional component consisting essentially of N-methylaminoanthraquinone in about equal amounts of formulation and N-methylaminoanthraquinone.

8. The formulation in accordance with claim 1 wherein the nitrogen-rich compound is triaminoguanidinium 5-nitroaminotetrazole and the catalyst is vanadyl 2-methyl-5-tetrazole-carboxylate trihydrate.

9. The formulation in accordance with claim 1 wherein the nitrogen-rich compound is triaminoguanidinium 5-nitroaminotetrazole and the catalyst is vanadyl N-(2-hydroxphenyl)salicylideneimine.

10. The formulation in accordance with claim 1 wherein the nitrogen-rich compound is nitroaminoguanidine and the catalyst is vanadyl acetylacetone.

References Cited
UNITED STATES PATENTS

| | | | |
|---|---|---|---|
| 2,987,520 | 6/1961 | Sickman | 149—92 X |
| 3,173,921 | 3/1965 | Einberg | 149—92 X |
| 3,293,853 | 12/1966 | Bedell | 149—92 X |
| 3,348,985 | 10/1967 | Stadler et al. | 149—92 X |
| 3,362,859 | 1/1968 | Sutton et al. | 149—19 |
| 3,483,211 | 12/1969 | Coburn | 149—92 X |

CARL D. QUARFORTH, Primary Examiner

S. J. LECHERT, JR., Assistant Examiner

U.S. Cl. X.R.

149—109